3,166,608
ELASTIC PRODUCTS CONSISTING OF HYDRO-
CARBON ELASTOMERS REINFORCED BY FI-
BERS OF A HIGHLY ISOTACTIC POLYMERIC
HIGHER ALPHA-OLEFIN AND PROCESSES FOR
OBTAINING THE SAME
Giulio Natta, Milan, Giovanni Crespi, Busto Arsizio
(Varese), and Giancarlo Borsini, Milan, Italy, assignors
to Montecatini Societa Generale per l'Industria Minera-
ria e Chimica, a corporation of Italy
No Drawing. Filed Nov. 21, 1958, Ser. No. 775,343
Claims priority, application Italy Nov. 27, 1957
20 Claims. (Cl. 260—878)

This invention relates to new vulcanized elastomers comprising natural or synthetic rubber reinforced with textile fibers of a linear polymeric alpha-olefin and more particularly with textile fibers of linear polypropylene containing a predominant proportion of isotactic macromolecules.

At present, in the manufacture of such articles as tire carcasses, driving belts, conveyor belts, flexible tubes, etc. from natural or synthetic rubbers, cotton, rayon or nylon fabrics or cords are used for reinforcing the rubber. While cotton and rayon fibers have a rather high initial elastic modulus (40–50 g./den.) they have a relatively low tensile strength (2–3 g./den.) so that in order to obtain the necessary reinforcement of rubbers with those fibers in practice, fabrics or cords of considerable thickness have to be used. The necessity for using the thick reinforcements increases the size of the manufactured articles and, also, the thick fabrics and cords retard the dissipation of heat when the articles are subjected to continuously varying external stresses in use.

Nylon has a higher tensile strength than either cotton or rayon and this permits somewhat thinner fabrics and cords of nylon to be used as the reinforcement. However, the nylon reinforcements have the decided disadvantage that nylon has a low initial elastic modulus (about 20 g./den.), and, under stress, manufactured articles comprising nylon reinforced rubbers have relatively poor dimensional stability which is inferior to that of articles comprising rubbers reinforced with either cotton or rayon.

Up to the present time, no fibrous reinforcements for natural rubber or for synthetic rubbers have been available which are strong, have minimum thickness for the given type of article and the use for which it is intended and, at the same time, have high dimensional stability under stress.

It is an object of the present invention to provide new manufactured articles comprising natural or synthetic rubber, or mixtures of natural and synthetic rubbers, reinforced with textile fibers, and having the aforesaid combination of characteristics and properties.

This and other objects are accomplished by the present invention which provides new manufactured articles comprising vulcanized elastomers reinforced with textile fibers of a linear, high molecular weight polymeric alpha-olefin containing a predominant proportion of isotactic macromolecules.

Natta et al. have disclosed, for instance in U.S. Patent No. 2,882,263 issued April 14, 1959, new polymerizates of the alpha-olefins $CH_2=CHR$ where R is hydrocarbon, which substantially consist of or comprise isotactic macromolecules. "Isotactic" macromolecules, as defined by Natta et al. are those macromolecules which, for at least very long sections of the main chain, or for substantially the entire length of the main chain, have a structure of the kind shown in the model below:

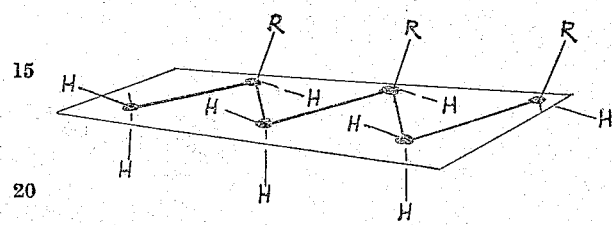

(Model of a portion of the main chain of an isotactic macromolecule of an alpha-olefin polymer according to Natta et al., arbitrarily fully extended in a plane)

As shown in said Natta et al. patent, when the isotactic macromolecules are produced in a mixture with non-isotactic macromolecules, or with macromolecules which only contain isotactic sections, the different types of macromolecules can be separated on the basis of their different steric structures, using selective solvents.

The isotactic macromolecules and polymers made up of them are crystalline or crystallizable.

The fibers used as reinforcement for natural or synthetic rubbers according to this invention are textile fibers of a polypropylene containing a high proportion (over 80%) of isotactic macromolecules as defined, and which is highly crystalline. The polypropylene from which the reinforcing fibers are made can contain some stereoblock macromolecules and/or amorphous-atactic macromolecules.

Fibers of these polypropylenes have been described by Natta et al. On the basis of their mechanical properties, and tenacity polypropylene fibers appeared to have advantages over rayon, cotton or nylon as reinforcement for rubbers.

The mechanical properties of the polypropylene fibers, particularly the initial elastic modulus (35–45 g./den.) have values which are in the same range as the mechanical properties of rayon and cotton. At the same time, the tenacity of the polypropylene fibers (5–7 g./den.) is at least equal to that of nylon. Therefore, the polypropylene fibers combining the desirable characteristics of both cotton and rayon, on the one hand, and nylon on the other, appeared to be particularly suitable for use as reinforcements for vulcanizable elastomers.

Another characteristic of the polypropylene fibers which indicated their adaptability to use as reinforcing means for the vulcanizable elastomers is their elasticity. Some mechanical characteristics of the polypropylene fibers are listed in Table I below and contrasted with the characteristics of various conventional fibers:

TABLE I

|  | Tensile strength, g./den. | Elongation at break, percent | Permanent set at 15% elongation |
| --- | --- | --- | --- |
| Polypropylene | 5-7 | 20-30 | 2-3 |
| Nylon | 5-7 | 20-25 | 2-3 |
| Terylene | 4-5 | 15-20 | 6-8 |
| Rayon | 2-3 | 15-18 | 8-10 |
| Cotton | 1.5-2.5 | 5-7 | [1] 1-1.5 |

[1] The permanent set of cotton is determined at an elongation of 5%.

It is evident from Table I that the polypropylene fiber is highly elastic and that, having elongations below 10%, its recovery from deformation is practically complete.

An additional characteristic which is important in a rubber reinforcement, and which is possessed by the polypropylene fiber, is a high resistance to repeated stresses.

Table II below shows the results of some tests carried out with various fibers under the same conditions, i.e., subjecting the fibers to stresses at a frequency of 50 cycles/minute:

TABLE II

|  | Initial properties | Properties after 100 cycles Stresses Comprised Between— | | Properties after 100 cycles Stresses Comprised Between 0 and 2.5 g./den. |
| --- | --- | --- | --- | --- |
|  |  | 0 and 2.5 g./den. | 0 and 5 g./den. |  |
| Polypropylene: |  |  |  |  |
| Permanent set, percent |  | 0.6 | 2 | 2 |
| Elongation, percent | 28 | 27 | 25 | 25 |
| Tenacity, g./den. | 6.5 | 6.5 | 6.6 | 6.8 |
| Nylon: |  |  |  |  |
| Permanent set, percent |  | 1.4 | the filaments break during the tests after 67 cycles. | 3.2 |
| Elongation, percent | 30 | 25 |  | 23 |
| Tenacity, g./den. | 5.5 | 5.6 |  | 5.5 |
| Terylene: |  |  |  |  |
| Permanent set, percent |  | 3 | the filaments break during the tests after 41 cycles. | 9 |
| Elongation, percent | 16 | 13 |  | 11 |
| Tenacity, g./den. | 5.2 | 5.5 |  | 5.7 |

It is apparent from Table II that it could be expected that manufactured articles of rubber reinforced with polypropylene fibers could be subjected to stresses of a high frequency and intensity without showing any undesirable permanent deformation or progressive hardening resulting in a decrease in the elongation at break or in the brittle point characteristics.

All of the foregoing characteristics of the polypropylene fibers, which were known, were favorable to their use with natural or synthetic rubbers as a superior reinforcement therefor to yield vulcanized articles having, in combination, properties which could not be obtained with reinforcements consisting of rayon, cotton or nylon fibers.

Nevertheless, in spite of the properties favoring the use of polypropylene fibers as rubber reinforcing agents, including also their low specific gravity and low cost, it did not appear that the polypropylene fibers could be used in practice for reinforcing rubber. Two major drawbacks to the practical use of the isotactic polypropylene fibers for reinforcing rubber existed (1) the relative low melting point of the polymer which would prevent the use of vulcanization temperatures above 150° C., and (2) the poor adhesive properties generally possessed by isotactic polypropylene.

The present invention not only makes it possible to use the polypropylene fibers as reinforcing agents for natural and synthetic rubbers in practice, but also provides a method the results of which are, in various respects, superior to the results which can be obtained using reinforcements made from fibers of other types.

It is important, in using fabrics or yarns as a reinforcing means for elastomers, to obtain a strong, tenacious, permanent bond or adhesion between the elastomer and the fibers of the reinforcing fabric or yarn. In the case of articles made of elastomers reinforced with fibers, each of the materials has a different elastic modulus, and each tends to undergo a different deformation when the article is stressed. Unless there is strong and permanent adhesion between the elastomer and the reinforcing fabric, they tend to separate when the article is subjected to repeated stresses. In order to obtain maximum adhesion between the elastomer and fabric in such articles, when the fibers are not sufficiently adhesive to bond directly to the elastomer, it has been the practice to coat the fibers with extraneous adhesive substances or compositions, before combining them with the elastomer.

Thus, using reinforcing fibers made of rayon or nylon fibers, it has been conventional to coat the fabric with mixtures of latex and resorcinol-formaldehyde, or with solutions of di-isocyanates or tri-isocyanates.

The present process for utilizing the polypropylene fibers as elastomer reinforcements does not depend on the use of extraneous adhesive coatings.

We find, surprisingly, that although the polypropylene is a substantially saturated polymer, it is possible to combine it with the hydrocarbons of rubber, through bridge linkages which function as chemical anchors. This is accomplished by activating the reactive tertiary carbon atoms contained in the polypropylene chain.

Activation of the tertiary C atoms to form the chemical anchors can be effected by means of peroxidic oxygen which can be supplied by peroxidic groups bound to the chain of the propylene polymer, or by peroxides used as vulcanization agents in the step of vulcanizing the natural or synthetic rubber after it has been combined with the polypropylene fiber reinforcement.

We have found that it is possible to effect a surface peroxidation of the polypropylene in the fiber formed without any appreciable damage to the polymer. The superficial peroxidation as disclosed in the pending application of Natta et al, Ser. No. 643,915 filed March 5, 1957, renders the polypropylene of the fibers capable of entering into surface reactions and capable of co-vulcanization with natural and synthetic resins.

As disclosed in said pending application the peroxidation can be accomplished by exposing the polypropylene fibers to air or an oxygen-containing gaseous mixture at 50° C to 85° C.

Textile fibers formed from a propylene polymerizate containing, in addition to a predominant proportion of isotactic, crystalline macromolecules, some amorphous polymers, (e.g., due to the presence of stereoblock macromolecules or the incomplete crystallization of the isotactic portions) can be peroxidized not only on the outer surface of the fibers or reinforcing yarn made therefrom but also, due to the diffusion of oxygen through the non-crystalline polypropylene, or the outer portion of crystals which occur inside of the fibers. A peroxidation in depth is thus obtained which, however, does not alter the mechanical properties of the yarn which depend on the crystalline isotactic portions thereof. This peroxidation in depth makes it possible to obtain (at the vulcanization temperature at which miscibility by diffusion of the elastomer through the amorphous polypropylene, or vice-versa, can occur) a co-vulcanization of the elastomer with a portion of the polypropylene constituting the fibrous reinforcement.

The end result is a reciprocal peneration of the two materials and an adhesion thereof, one to the other, the values for which would be otherwise inconceivable for a reinforcement made of fibers having a smooth surface such as those obtained by extrusion of the polypropylene.

Under the conditions disclosed herein, the fibrous reinforcement of polypropylene comprising a predominant proportion of isotactic macromolecules adheres tenaciously and permanently to the vulcanizable elastomer.

The vulcanizable elastomer may be natural rubber, or a linear, vulcanizable, substantially saturated and amorphous homopolymer of an alpha-olefin $CH_2=CHR$ where R is an alkyl radical containing 1 to 5 carbon atoms as described in Natta et al. patent No. 2,882,263. The vulcanizable elastomer may also be a linear, substantially saturated and amorphous copolymer of the alpha-olefins with each other or with ethylene and containing 20% to 70% of ethylene by weight in the macromolecule, as disclosed in the pending application of Natta et al., Serial No. 629,085, filed December 18, 1956. The elastomer may also comprise mixtures of the substantially saturated and amorphous alpha-olefin homopolymers and copolymers with natural rubber and/or with unsaturated synthetic polymers of rubber character containing, in the macromolecule thereof, monomeric units derived from aliphatic diolefins. Where the last-mentioned mixtures are used as the elastomer, the mixture may contain the saturated and amorphous homopolymer or copolymer and the unsaturated rubbery polymer in a weight ratio between 20:80 and 90:10.

The preferred elastomers for use in practicing this invention are the substantially saturated and amorphous alpha-olefin homopolymers and copolymers described by Natta et al. in U.S. Patent No. 2,882,263 and pending application Serial No. 629,085 filed December 18, 1956.

The amorphous alpha-olefin homopolymers and copolymers can be produced by polymerizing the alpha-olefins, mixtures thereof with each other, or mixtures thereof with ethylene, with catalysts obtained by (a) starting with a halide of a transition metal of Groups IV to VI inclusive of the Mendeleeff Periodic Table in which the metal has a valence higher than 3 and (b) reducing the transition metal halide with a metallorganic compound of an element of columns II to III of the table.

The rubbers obtained from said amorphous linear, alpha-olefin homopolymers and copolymers, more especially, from the copolymers, have excellent mechanical and elastic characteristics, and resistance to aging, which make them suitable for producing various types of manufactured rubber articles.

We have found that a particularly good adhesion can be obtained between the vulcanizable elastomers based on the alpha-olefin homopolymers and copolymers, and the fibers formed of the polyproplene containing a predominant proportion of isotactic macromolecules, and that a remarkable reinforcement of those vulcanizable hydrocarbon elastomers can be obtained by combining them with the reinforcing polypropylene fibers (fabrics or cords), and then heating the combination at vulcanization temperature under conditions which activate the reactive tertiary carbon atoms contained in the polypropylene constituting the reinforcing fibers.

Vulcanization is the final step in the process. Particularly satisfactory vulcanization procedures for use in the practice of the present invention are disclosed in the pending applications of Natta et al., Serial No. 741,014, filed June 10, 1957, and G. Crespi et al., Serial No. 741,345, filed June 11, 1958.

According to said methods, the vulcanization is carried out by heating the rubbery alpha-olefin homopolymer or copolymer in the presence of the radical initiator and a polymerizable unsaturated monomer which may be an aromatic hydrocarbon or an unsaturated compound containing one or more functional acidic groups and which is capable of grafting onto the chains of the polyalpha-olefin.

A polyvalent metal oxide may also be present during the vulcanization.

Those methods can be applied, advantageously, to the vulcanization of the elastomers combined with the polypropylene fibers.

By "radical initiator" is meant a substance which initiates reactions by a free radical mechanism.

Radical initiators which can be mixed with the elastomer to be reinforced include peroxides, hydroperoxides and per-esters. For instance, the radical initiator may be dibenzoyl peroxide, dicumyl peroxide, tert. butyl peroxide, chloro-benzoyl peroxide, tert. buty perbenzoate, etc.

Where a peroxide, hydroperoxide or per-ester is added as such to the elastomer, the radical initiator may be used in an amount of 0.002 to 0.02 mols thereof per 100 g. of the elastomer.

The polymerizable monomer capable of grafting onto the chains of the polypropylene of the reinforcing fibers may be, for instance, styrene, divinyl-benzene or an unsaturated compound containing acidic functional groups, such as maleic acid, maleic anhydride, maleic acid esters which is capable of reacting with free radicals and of entering into copolymerization reactions, but has little tendency to form long homopolymeric chains.

The unsaturated polymerizable compound can be mixed with the amorphous alpha-olefin homopolymer or copolymer or mixtures of those polymers with unsaturated natural or synthetic rubber, in various amounts. When an unsaturated aromatic hydrocarbon is used, an amount of 5 to 40 parts per 100 parts of the rubber can be added.

The radical initiator, which decomposes at the vulcanization temperature, initiates the polymerization of the unsaturated polymerizable monomer which results in the formation of cross-links between the polymer chains.

The free radicals which initiate the reaction may be released by decomposition of hydroperoxide groups bound to the chains of the amorphous alpha-olefin polymer to be vulcanized, if the polymer is subjected to a peroxidizing treatment as disclosed, e.g., in the pending application of Natta et al, Ser. No. 600,718, now Patent No. 2,972,605. The free radicals may also be released by decomposition of hydroperoxide groups bound to the chains of the polypropylene forming the reinforcing fibers, as already mentioned hereinabove.

Suitable plasticizing agents, pigments, color effect materials, etc., can be mixed with the elastomer, or with the polypropylene containing a predominant proportion of isotactic macromolecules, prior to extruding the latter to obtain the reinforcing fibers to be used as such or after fabrication into cords or fabrics.

Various kinds of manufactured articles can be made by combining the hydrocarbon elastomer with the reinforcing polypropylene fibers, shaping the combination as desired, and vulcanizing it in said shape by heating it at a temperature of 130° C. to 150° C. in contact with the peroxidic oxygen and, optionally, the unsaturated polymerizable monomer and metal oxide.

Excellent adhesion of the reinforcement to the hydrocarbon elastomer is obtained by the present invention. The polymerizable unsaturated monomer which is added to the mass prior to the vulcanization can be assumed to polymerize in contact with both the polypropylene of the reinforcing fibers and the hydrocarbon rubber, thus forming chemical bonds between those two materials.

The radical initiators may pre-exist either on the hydrocarbon elastomer or on the polypropylene fiber and, as noted, they are decomposed during the heating, thus forming free radicals which will act in the same way in either case.

The termination reaction of a growing chain can thus occur by coupling with a radical placed on a chain of the reinforcing fiber, thus insuring a perfect adhesion between the polymer constituting the elastomer, and the polymer constituting the reinforcing fiber. The adhesion can be still further improved, in some instances, by providing the reinforcing polypropylene fabric or cords with a pre-coating of a hydrocarbon solvent solution of the vulcanizable mixture comprising the hydrocarbon elastomer and other ingredients, except carbon black. This enables the vulcanizable amorphous alpha-olefin homopolymer or copolymer to penetrate between the yarns of reinforcing fabric, or to surround the reinforcing cord, and results in a perfect adhesion between the elastomer and reinforcement in the final vulcanized article.

Table III below gives the adhesion values which were determined according to ASTM D 413–39 on strips obtained by making a polypropylene tape adhere to a lamina made of an amorphous ethylene-propylene copolymer containing 20% to 70% of ethylene in the macromolecule, and then vulcanizing the assembly:

TABLE III

Polypropylene tape (Count of the yarns: 1 350 den.):
    Warp—100 filaments/10 cm.
    Weft—50 filaments/10 cm.
    Mix—ethylene-propylene copolymer 100 parts by weight, DVB 40 parts; dicumyl peroxide 7.5 parts; Carbon black MPC (Medium Processing Channel) 25 parts;
    Dutrex oil 5 parts. Vulcanization: 130° C. for 60 minutes.

Adhesive power, kg./cm.
Without any adhesive solution _____ 3.8
With an adhesive solution: ethylene-propylene copolymer 10 parts, DVB 300 parts, TBPB 0.5 part _ 7.0

(DVB—mixture consisting of 60.5% divinylbenzene, 15.4% ethylvinylbenzene, 24.1% saturated aryalkyl hydrocarbons. TBPB—tert. butyl perbenzoate.)

The adhesion is enhanced by increasing the vulcanizing temperature, since at the increased temperatures, that is, at temperatures above 130° C. and up to 150° C., stereoblock polymers which are generally present in the polypropylene begin to melt and favor the diffusion of the elastomer into the fiber. Some adhesion data determined on samples prepared with the fabric and mixture of Table III are given in Table IV below:

TABLE IV

[Type of fabric and mix: see Table III]

|  | Vulcanization | | Adhesive power, kg./cm. |
| --- | --- | --- | --- |
|  | Temperature, ° C. | Time, minutes |  |
| Without any adhesive solution | 130 | 60 | 3.8 |
|  | 150 | 40 | 5.8 |
| With adhesive solution | 130 | 60 | 7.0 |
|  | 150 | 40 | rubber breaks |

The use of superficially peroxidized polypropylene fibers as reinforcement for the elastomers is advantageous even if other vulcanization methods are used and in general when the mix comprises elastomers the vulcanization of which is favored by the presence of radical initiators.

The following examples are given to illustrate the invention, it being understood that these examples are not intended as limiting:

*Example 1*

100 parts by weight of a linear substantially amorphous ethylene-propylene copolymer containing 40% ethylene in the macromolecule are mixed with 40 parts of a mixture consisting of 60.5% divinylbenzene, 24.1% saturated arylalkyl hydrocarbons and 15.4% ethylvinyl benzene and, successively, 25 parts MPC carbon black, 5 parts plasticizer Dutrex oil (i.e., a mineral oil extender of an aromatic and naphthenic character for synthetic rubber, see "Compounding Ingredients for Rubber" by the Editors of "India Rubber World," page 195, 2nd Edition, New York, 1947) and 7.5 parts dicumyl peroxide are added. The whole is mixed at 50° C. for 30 minutes. The mix thus prepared is applied to a tape of polypropylene fabric, consisting of a weft of 5 yarns per cm. in the longitudinal direction and 10 yarns per cm. in the transverse direction, and then placed in a mold which is heated at 130° for 1 hour.

From the tape consisting of fabric-elastomer, obtained by vulcanization, specimens are cut in the shape of rectangular strips with a width of 1.25 cm. and a length of 7 cm., on which the adhesive power, expressed in kg. per cm. of stripping line, is determined according to ASTM specifications. Adhesive power at 20° C.=3.8 kg./cm.

By effecting the vulcanization at higher temperatures, e.g., at 150° C. for 40 minutes, the adhesive power (at 20° C.) is increased to 5.8 kg./cm.

*Example 2*

The mix prepared as in Example 1 is applied to a tape of a polypropylene fabric consisting of a warp of 10 yarns per cm. in the longitudinal direction and 5 yarns per cm. in the transverse direction, previously immersed in a benzene solution of the ethylene-propylene copolymer and then dried to remove the solvent. After vulcanization at 130° C. for 1 hour under a pressure of 70 kg./cm., the adhesive power is found to be 3.8 kg./cm.

*Example 3*

An adhesive mixture is prepared by adding 10 parts of the ethylene-propylene copolymer and 0.5 parts of tert. butyl perbenzoate to 300 parts by weight of the mixture of divinyl benzene with ethyl vinyl benzene and other hydrocarbons as in Example 1. The mixture is applied to a tape of polypropylene fabric and the coated surface of the fabric is then placed on a mixture comprising the copolymer and prepared as in Example 1.

After vulcanization at 130° C. for 1 hour, the adhesive power is 7 kg./cm.; after vulcanization at 150° C. for 40 minutes, the adhesive power is higher than the tensile strength of the vulcanized elastomer.

All kinds of manufactured articles which are normally made of rubber can be made by the present invention and the articles obtained, such as tires, tubes, rubber bands, gloves, hot water bottles, conveyor and driving belts, etc., have improved properties and a longer effective service life because of the unique reinforcing characteristics of the fibers made from the polymeric alpha-olefins, e.g., polypropylene containing a predominant proportion of isotactic macromolecules.

The foregoing examples clearly demonstrate the excellent adhesion that is obtained between the hydrocarbon elastic rubber and the reinforcing polypropylene fibers. Obviously, some changes can be made in details in practicing the invention without departing from the spirit thereof. Therefore, it is intended to include in the scope of the appended claims all such modifications and variations as may be apparent to those skilled in this art from the description and examples given herein.

We claim:

1. A vulcanized elastic product consisting essentially of hydrocarbon elastomers selected from the group consisting of (a) natural rubber, (b) linear, substantially saturated and amorphous copolymers of higher alpha-olefins of the formula $CH_2=CHR$ wherein R is an alkyl radical containing from 1 to 5 carbon atoms with ethylene containing from 20% to 70% of ethylene in the copolymer macromolecule, (c) mixtures of said higher alpha-olefin ethylene copolymers with at least one member selected from the group consisting of (1) natural rubber and (2) unsaturated synthetic hydrocarbon rubbery polymers of aliphatic conjugated dienes, said hydrocarbon elastomers being reinforced by fibers of a linear, polypropylene containing over 80% isotactic macromolecules, and said elastomer being co-vulcanized with and chemically bound to the polypropylene reinforcing fibers through short polymeric bridge linkages formed of units of a substance selected from the group consisting of styrene and divinyl benzene.

2. A vulcanized elastic product consisting essentially of vulcanizable linear, substantially saturated and amorphous copolymer of an alpha-olefin of the formula $CH_2=CHR$ wherein R is an alkyl radical containing from 1 to 5 carbon atoms with ethylene and containing from 20% to 70% of ethylene by weight in the macromolecule, reinforced with fibers of linear polypropylene containing over 80% of isotactic macromolecules.

3. A vulcanized elastic product consisting essentially of a vulcanizable linear, substantially saturated and amorphous copolymer of propylene with ethylene containing from 20% to 70% of ethylene by weight in the macromolecule, reinforced with fibers of linear polypropylene containing over 80% of isotactic macromolecules.

4. An elastic product consisting essentially of hydrocarbon elastomers as recited in claim 1, reinforced with fabrics and cords made from fibers of polypropylene containing over 80% of isotactic macromolecules, the hydrocarbon elastomer and polypropylene being co-vulcanized in the article and chemically bonded to each other by short polymeric cross-links between the chains thereof, said cross-links being formed of units of divinyl benzene.

5. An elastic product consisting essentially of a vulcanizable, linear, substantially saturated and amorphous homopolymer of an alpha-olefin of the formula $$CH_2=CHR$$

wherein R is an alkyl radical containing from 1 to 5 carbon atoms reinforced with fibers and cords made of fibers of polypropylene containing over 80% of isotactic macromolecules, the vulcanizable homopolymer and polypropylene being co-vulcanized in the article and chemically bonded to each other by short polymeric cross-links between the chains thereof, said cross-links being formed of units of divinyl benzene.

6. An elastic product consisting essentially of a vulcanizable, linear, substantially saturated and amorphous copolymer of propylene with ethylene containing from 20% to 70% of ethylene by weight in the macromolecule, reinforced with fibers and cords made of polypropylene containing over 80% of isotactic macromolecules, the copolymer and polypropylene being co-vulcanized in the article and chemically bonded to each other by short polymeric cross-links between the chains thereof, said cross-links being formed of units of divinyl benzene.

7. The method of making vulcanized elastic products which method comprises combining a vulcanizable hydrocarbon elastomer as recited in claim 1, with reinforcing fibers of a linear polypropylene containing over 80% isotactic macromolecules, and heating the combination to a vulcanizing temperature between 130° C. and 150° C. in contact with peroxidic oxygen.

8. The method of claim 7, wherein the vulcanized hydrocarbon elastomer is a linear, substantially saturated and amorphous copolymer of propylene and ethylene containing from 20% to 70% by weight of ethylene in the copolymer macromolecule.

9. The method according to claim 7, characterized in that the peroxide oxygen is released during the heating by decomposition of an organic peroxide present in the combination.

10. The method according to claim 7, characterized in that the peroxidic oxygen is released during the heating by decomposition of hydroperoxide groups initially bound to the chains of the polypropylene forming the reinforcing fibers.

11. The method of claim 7, characterized in that the vulcanizable hydrocarbon elastomer and reinforcing fibers are heated in contact with peroxidic oxygen and a substance selected from the group consisting of styrene and divinyl benzene.

12. The method of claim 11, characterized in that the reinforcing fibers are formed of a polypropylene containing hydroperoxide groups substantially localized at the surface of the fibers.

13. The method of claim 11, characterized in that the vulcanizable hydrocarbon elastomer is a linear, substantially saturated and amorphous homopolymer of an alpha-olefin of the formula $CH_2=CHR$, wherein R is an alkyl radical containing from 1 to 5 carbon atoms.

14. The method of claim 11, characterized in that the vulcanizable hydrocarbon elastomer is a linear, substantially saturated and amorphous copolymer of ethylene and propylene containing 20% to 70% of ethylene by weight in the macromolecule.

15. The method of claim 11, characterized in that the vulcanizable hydrocarbon elastomer and reinforcing fibers are heated in contact with an organic peroxide and divinyl benzene.

16. The method of claim 11, characterized in that the reinforcing fibers are impregnated with a hydrocarbon solvent containing the vulcanizable hydrocarbon elastomer, an organic peroxide, and a substance selected from the group consisting of styrene and divinyl benzene.

17. A tire comprising a vulcanized elastic product consisting essentially of a hydrocarbon elastomer as recited in claim 1, reinforced by fibers of linear polypropylene containing over 80% of isotactic macromolecules, the elastomer being co-vulcanized with and chemically bound to the polypropylene of the reinforcing fibers by short polymeric bridge linkages formed of units of a substance selected from the group consisting of styrene and divinyl benzene.

18. A tire according to claim 17, characterized in that the hydrocarbon elastomer is a linear, substantially saturated and amorphous copolymer of propylene and ethylene containing from 20% to 70% by weight of ethylene in the macromolecule.

19. A manufactured, molded article comprising a vulcanized elastic product consisting of a hydrocarbon elastomer as recited in claim 1, reinforced by fibers of linear polypropylene containing over 80% of isotactic macromolecules the elastomer being co-vulcanized with and chemically bound to the polypropylene of the reinforcing fibers through short polymeric bridge linkages formed of units a substance selected from the group consisting of styrene and divinyl benzene.

20. A manufactured molded article comprising a linear, substantially saturated and amorphous copolymer of propylene and ethylene containing from 20% to 70% by weight of ethylene in the copolymer macromolecule, reinforced by fibers of linear polypropylene containing over 80% of isotactic macromolecules, the copolymer being co-vulcanized with and chemically bound to the polypropylene of the reinforcing fibers through short polymeric bridge linkages formed of units of divinyl benzene.

References Cited in the file of this patent

UNITED STATES PATENTS

| | | |
|---|---|---|
| 2,213,423 | Wiezevich | Sept. 3, 1940 |
| 2,692,257 | Zletz | Oct. 19, 1954 |
| 2,837,496 | Vandenberg | June 3, 1958 |
| 2,882,263 | Natta et al. | Apr. 14, 1959 |
| 2,927,047 | Schulde et al. | Mar. 1, 1960 |
| 2,927,904 | Cooper | Mar. 8, 1960 |
| 2,939,860 | Schramm | June 7, 1960 |
| 2,950,267 | Thompson et al. | Aug. 23, 1960 |
| 3,020,174 | Natta et al. | Feb. 6, 1962 |
| 3,024,211 | Daly | Mar. 6, 1962 |
| 3,036,987 | Ranalli | May 29, 1962 |

FOREIGN PATENTS

| | | |
|---|---|---|
| 552,116 | Belgium | Apr. 26, 1957 |

OTHER REFERENCES

Natta: v. Am. Chem. Soc. 77, page 1708 (1955).
Ellis: "The Chemistry of Synthetic Resins" Pub. 1935 by Reinhold Corp., pp. 1272, 1278.